United States Patent
Lakshminarayanan et al.

(10) Patent No.: US 11,314,081 B2
(45) Date of Patent: Apr. 26, 2022

(54) INCREASED BIT DEPTH IN HIGH FRAME RATE APPLICATIONS

(71) Applicant: Texas Instruments Incorporated, Dallas, TX (US)

(72) Inventors: Aravind Lakshminarayanan, Plano, TX (US); Daniel J. Morgan, McKinney, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/425,588

(22) Filed: May 29, 2019

(65) Prior Publication Data
US 2020/0209642 A1 Jul. 2, 2020

Related U.S. Application Data

(60) Provisional application No. 62/786,419, filed on Dec. 29, 2018.

(51) Int. Cl.
| | |
|---|---|
| *G02B 27/00* | (2006.01) |
| *G02B 27/01* | (2006.01) |
| *G09G 3/34* | (2006.01) |
| *G09G 3/20* | (2006.01) |

(52) U.S. Cl.
CPC ..... *G02B 27/0068* (2013.01); *G02B 27/0172* (2013.01); *G02B 27/0179* (2013.01); *G09G 3/2014* (2013.01); *G09G 3/3406* (2013.01); *G09G 3/3433* (2013.01); *G09G 2310/0264* (2013.01)

(58) Field of Classification Search
CPC ............ G02B 27/0068; G02B 27/0179; G02B 27/0172; G09G 3/3406; G09G 3/2014; G09G 3/3433; G09G 3/2018; G09G 3/346; G09G 2310/0264; G09G 2330/025
See application file for complete search history.

(56) References Cited

U.S. PATENT DOCUMENTS

| | | | |
|---|---|---|---|
| 9,907,135 B2 | 2/2018 | Farris | |
| 2006/0268002 A1* | 11/2006 | Hewlett | ............... G09G 3/3406 345/600 |
| 2008/0217509 A1* | 9/2008 | Weatherford | ........ G03B 21/005 250/205 |

(Continued)

OTHER PUBLICATIONS

Texas Instruments Inc., "DLPA2005 Power Management and LED/Lamp Driver IC" (2015) http://www.ti.com/lit/ds/symlink/dlpa2005.pdf Texas Instruments Inc.,12500 TI Boulevard Dallas, Texas 75243 USA.

*Primary Examiner* — Liliana Cerullo
(74) *Attorney, Agent, or Firm* — Michelle F. Murray; Charles A. Brill; Frank D. Cimino

(57) ABSTRACT

Described examples include a process that includes illuminating a spatial light modulator at a first illumination level during a first bit-plane and stopping illumination at a beginning of a second bit-plane subsequent to the first bit-plane. The process also includes resuming illumination after a settling period of the spatial light modulator at a second illumination level for a time period such that a total illumination energy during the second bit-plane is equivalent to an intended illumination energy for the second bit-plane at the first illumination level and stopping illumination at the second illumination level before a subsequent third bit-plane.

20 Claims, 7 Drawing Sheets

(56) References Cited

U.S. PATENT DOCUMENTS

| | | | |
|---|---|---|---|
| 2009/0051712 A1* | 2/2009 | Arai | H04N 9/3155 345/690 |
| 2009/0135315 A1* | 5/2009 | Endo | G02B 27/1026 348/771 |
| 2017/0162107 A1* | 6/2017 | Ninan | G09G 3/3426 |
| 2019/0347981 A1* | 11/2019 | Horowitz | G09G 3/02 |

* cited by examiner

INCREASED BIT DEPTH IN HIGH FRAME RATE APPLICATIONS

CROSS REFERENCE TO RELATED APPLICATIONS

This application claims the benefit under 35 U.S.C. § 119(e) to co-owned U.S. Provisional Patent Application Ser. No. 62/786,419, filed Dec. 29, 2018, entitled "INCREASED BIT DEPTH IN HIGH FRAME RATE APPLICATIONS," which is hereby incorporated by reference in its entirety herein.

TECHNICAL FIELD

This relates generally to displays, and more particularly to displays using spatial light modulators.

BACKGROUND

Many digital display devices use spatial light modulators to modulate the light for each pixel of a display to provide the desired color and light intensity. Applications like Near Eye Displays (NEDs) need high frame rates. NEDs are displays that are close to the eyes such as in-helmet displays for military applications and virtual reality goggles. To avoid eye stress, NEDs use techniques such as multifocal displays with high frame rates. With high frame rates, the time for displaying each color within a frame is shortened.

Spatial light modulators, such as digital micromirror devices (DMDs), modulate light intensity using micromirrors. Each micromirror corresponds to a pixel of the display. Each micromirror has an ON state where light is reflected to projection optics for projection and an OFF state where light is reflected away from the projection optics. A portion of each frame is devoted to each of the colors red, green and blue, for example, to provide a full color gamut. For each color, the micromirror modulates that color of light as provided by a light source according to color data for that pixel.

One way of modulating the light is by using bit-planes. "Bit-planes" can be defined to format the images for the spatial light modulator and to further improve the images for display. Because the pixel elements for a binary spatial light modulator are either ON or OFF, the intensity observed for a particular pixel is determined by the amount of time that pixel is on during the frame display time. The image data for the displayed image device may have several bits to represent color intensity for color at each pixel for a frame. A spatial light modulator can only process one bit per pixel for each image at a time, so a mapping is performed to create the intensity levels needed for each pixel during the frame display time at the spatial light modulator. By subdividing the frame display time into bit-planes, each having a bit for each of the pixels in the two-dimensional array at the spatial light modulator, a variety of intensities, corresponding to a "gray scale" for one color, can be achieved. If the pixel is ON for the entire display time, it will have a maximum brightness or intensity. If the pixel is OFF for the entire time, it will be dark, or have a minimum brightness or intensity. By using the bit planes, the entire range of color intensity available can be reproduced using the one bit per pixel available in the spatial light modulator.

Each color word is a binary number with a number of bits, such as nine. Out of the time that the color from the light source illuminates the spatial light modulator, each bit of the color word is assigned a portion of that time. The most significant bit will have half of that time because it represents half of the value of the color word. The next most significant bit has one quarter, and so on. If that bit position has a 1 in a pixel's color word, the corresponding micromirror is ON during that bit's bit-plane. If it is a 0, the corresponding micromirror is OFF during that bit's bit-plane. The eye integrates the light from when the micromirror is ON to perceive the desired light intensity.

To process each color word, each of the pixels on the spatial light modulator modulate the most significant bit at one time. This is the most significant bit-plane (MSB). That is, each of the micromirrors are set at the most significant bit for a respective color word at the same time. This repeats for each bit-plane from the most significant bit-plane down to the least significant bit-plane (LSB). As an example, with a color depth of nine bits, the time for the LSB is $1/512^{th}$ of the portion of the frame devoted to that color. That is, a nine-bit binary number can represent the decimal numbers 0 to 511. The least significant bit represents a decimal 1. Thus, the weight of the least significant bit is one out of 512. With high frame rates, the LSB display time is such a small amount of time that micromirror settling time, for example, can distort the amount of light reflected during the LSB. This distortion creates visible distortion in the output and limits the color depth capabilities of the display.

SUMMARY

In accordance with an example, a process includes illuminating a spatial light modulator at a first illumination level during a first bit-plane and stopping illumination at a beginning of a second bit-plane subsequent to the first bit-plane. The process also includes resuming illumination after a settling period of the spatial light modulator at a second illumination level for a time period such that a total illumination energy during the second bit-plane is equivalent to an intended illumination energy for the second bit-plane at the first illumination level and stopping illumination at the second illumination level before a subsequent third bit-plane.

DETAILED DESCRIPTION

Figure 1:
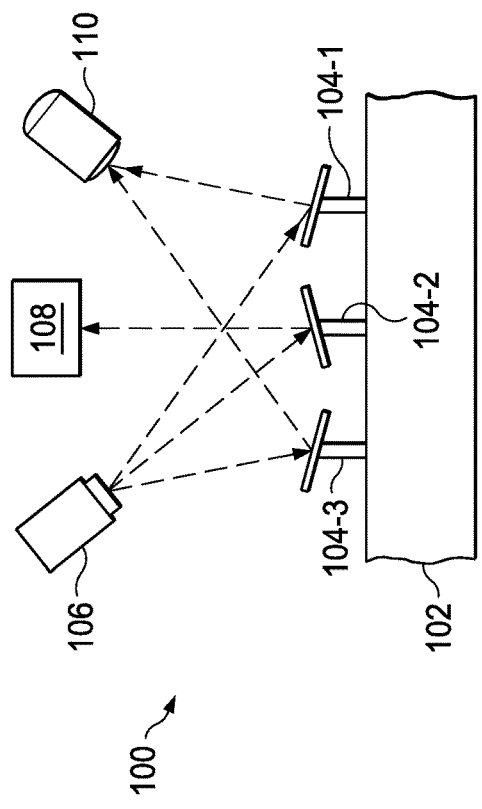
FIG. 1 is a schematic diagram of a digital micromirror device.

In the drawings, corresponding numerals and symbols generally refer to corresponding parts unless otherwise indicated. The drawings are not necessarily drawn to scale.

In this description, the term "coupled" may include connections made with intervening elements, and additional elements and various connections may exist between any elements that are "coupled."

In example arrangements, the problem of distortion of light output for smaller bit-planes is solved by separating the output of those bit-planes from preceding and succeeding bit-planes and/or by reducing the light output of the light source during such bit-planes.

This description describes configurations and processes for accurate and reliable light output with a spatial light modulator system for the smaller bit-plane(s). For example, the time for displaying the least significant bit-plane is isolated from the leading and following bit-plane. This avoids uncertainties caused by settling time of digital micromirrors affecting the net intensity of the bit, for example. In addition, this process allows for a break-before-make time that allows the light source to provide a more accurate initial output. In another example, the driving signal for the light source is reduced in magnitude during the least significant bit-plane relative to the driving signal used with other bit-planes. The illumination time is correspondingly increased so that the total illumination during the least significant bit-plane provides the proper amount of light energy for the least significant bit-plane. The lower magnitude for the driving signal allows for less rise time as a portion of the total illumination during the least significant bit-plane, and thus provides a more accurate and reliable light output.

FIG. 1 is a schematic diagram of a digital micromirror device (DMD) 100, which is one type of spatial light modulator. Substrate 102 supports micromirror 104-1, micromirror 104-2 and micromirror 104-3. Three micromirrors are shown for simplicity. Digital micromirror devices (DMDs) often include up to a million or more micromirrors. FIG. 1 shows micromirrors 104-1 and 104-3 in the ON position. In this position, light from light source 106 reflects from micromirrors 104-1 and 104-3 to projection optics 110 for projection to a screen, or to the user's view in a near eye display, for example. Thus, from the ON position, the pixel positions of micromirrors 104-1 and 104-3 display light. Conversely, micromirror 104-2 is in the OFF position. In the OFF position, light from light source 106 reflects away from projection optics 110 to light sink 108. Thus, from the OFF position, the pixel position of micromirror 104-2 does not display. When not in use, the micromirrors may return to a "flat" position, which is an unpowered position. In an example, light source 106 includes light emitting diodes (LEDs) that separately illuminate different colors; for example, providing red, green or blue illumination. Varying the perceived illumination amount from each of these colors as reflected by each pixel, as explained further hereinbelow, allows for the display of most colors at the respective pixel position on the display.

Figure 2:
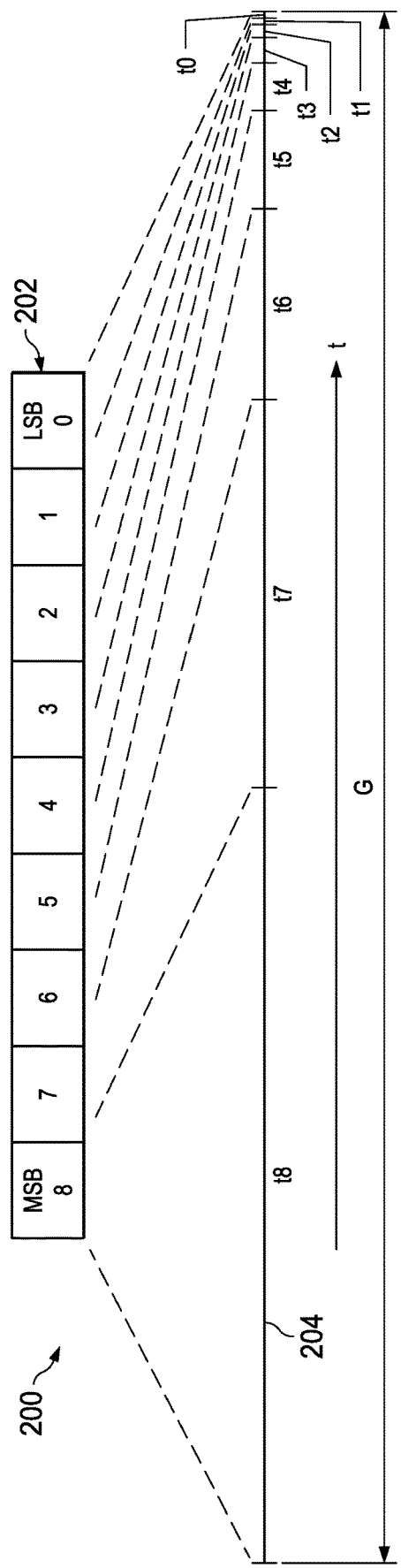
FIG. 2 is a timing diagram of nine bits of one color.

FIG. 2 is a timing diagram 200 of nine bits of one color. To display full color, the display source (video file, picture file, etc.) includes at least one word representing the color depth for each color for each pixel displayed. In most cases, the display source file includes the color data in a compressed, encoded format that is decoded prior to display. In this particular example, the colors are red, green and blue. In the example of FIG. 2, bits of a color 202 include nine bits. The smallest value of the color bits is zero. The largest value of the color bits is five hundred and eleven ("511"). The least significant bit represents the number one and the most significant bit represents the number two hundred and fifty-six ("256"). This example thus has a "color depth" of nine bits. In some examples, non-binary weighting schemes are employed across all bits to mitigate certain visual artifacts. With these schemes, the weight given to a bit is more or less than that bit's binary weight.

Time slots 204 shown as "t0" through "t8" correspond to the bits of a color 202. In this example, time for the color green is shown. As each of the bits of a color 202 correspond to a binary value, a time slot proportional to that value is assigned for all pixels in a spatial light modulator. The time t8 is the most significant bit and thus represents half (256/512) of the color weight of the bits of a color, so time t8 is half the time period G. Time t7 is one quarter (128/512) of the time period G and so on. During each time period, light source 106 illuminates the micromirrors of DMD 100 (FIG. 1). The micromirror for the illuminated pixels is ON or OFF during each bit's time period according to the bit value of that time period's corresponding bit for that pixel. Because the micromirrors display each corresponding bit at the same time, the time for each bit is called a bit-plane. For example, the most significant bit of all of the bits of a color is the most significant bit-plane (MSB). Each bit-plane is illuminated for a time that corresponds to that bit's value or weight. The eye integrates each of these bit-planes at each pixel to perceive the color (in this example green) at the intensity of the bits of a color for that pixel. This process repeats for each color to provide the desired color and brightness for each pixel of the display. FIG. 2 shows the bits linearly in time from greatest to least. However, in other arrangements, different times, different weights, and different colors display in different time arrangements, including interleaving colors.

Some near eye displays use six optical focal planes per eye to provide accurate depth perception with reduced eye strain. With one spatial light modulator per eye and a frame rate of 60 frames per second, the total frame rate needed is 6 planes×60 fps or 360 fps. Thus, a frame time is 1/360 fps or 2,778 μs. Green often has a 50% duty cycle to provide proper color balancing. This is the largest display time period of the colors at 1389 μs. With a nine-bit color depth, the least significant bit-plane time is 1389/512 or 2.7 μs. Experimental evidence shows that digital micromirrors have a settling time of approximately 2 μs. Therefore, using a straightforward bit-plane division of the illumination time means that the majority of the least significant bit-plane is affected by the uncertainty and inaccuracies caused by digital micromirror settling, because the display time is so close to the mirror settling time.

Figure 3:
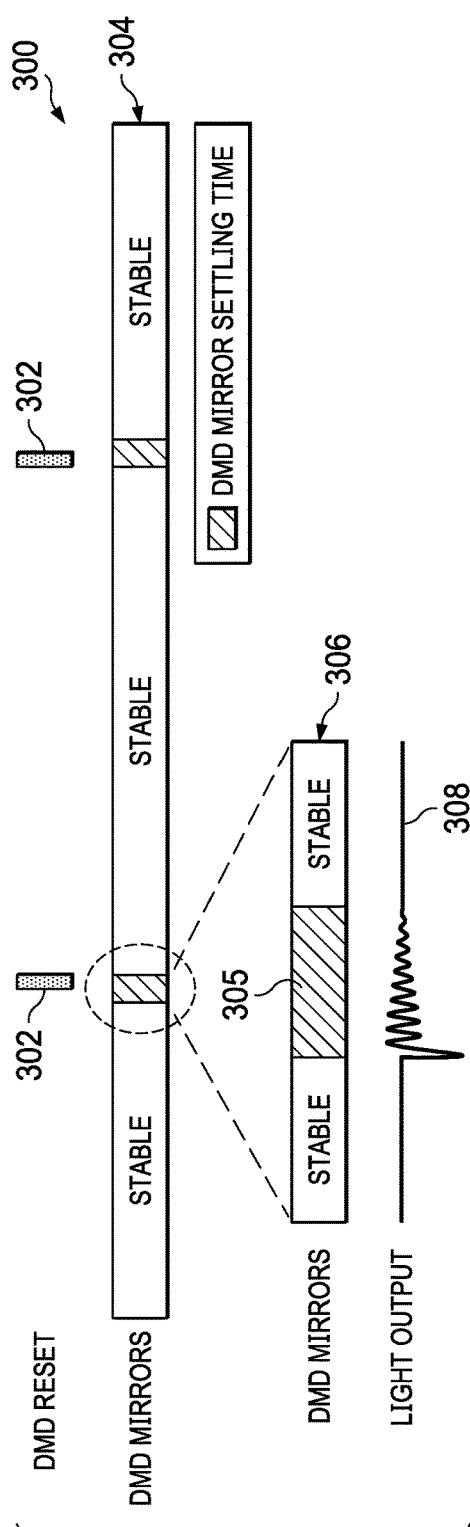
FIG. 3 is a timing chart showing the micromirror settling time.

FIG. 3 is a timing chart 300 showing the effect of micromirror settling time. Settling times 302 are at the end of a bit-plane when new data for the next bit-plane is being applied to the mirrors after transfer of the new data from the memory in the array associated with the mirrors for the next stable time, as shown in time line 304. Time line 306 is a subset of time line 304 at settling time 305. Light output line 308 shows that the light output from a micromirror during the settling time 305 varies widely during this time. Therefore, the illumination amount provided by the light reflected from the micromirror during settling time 305 is uncertain.

Figure 4:
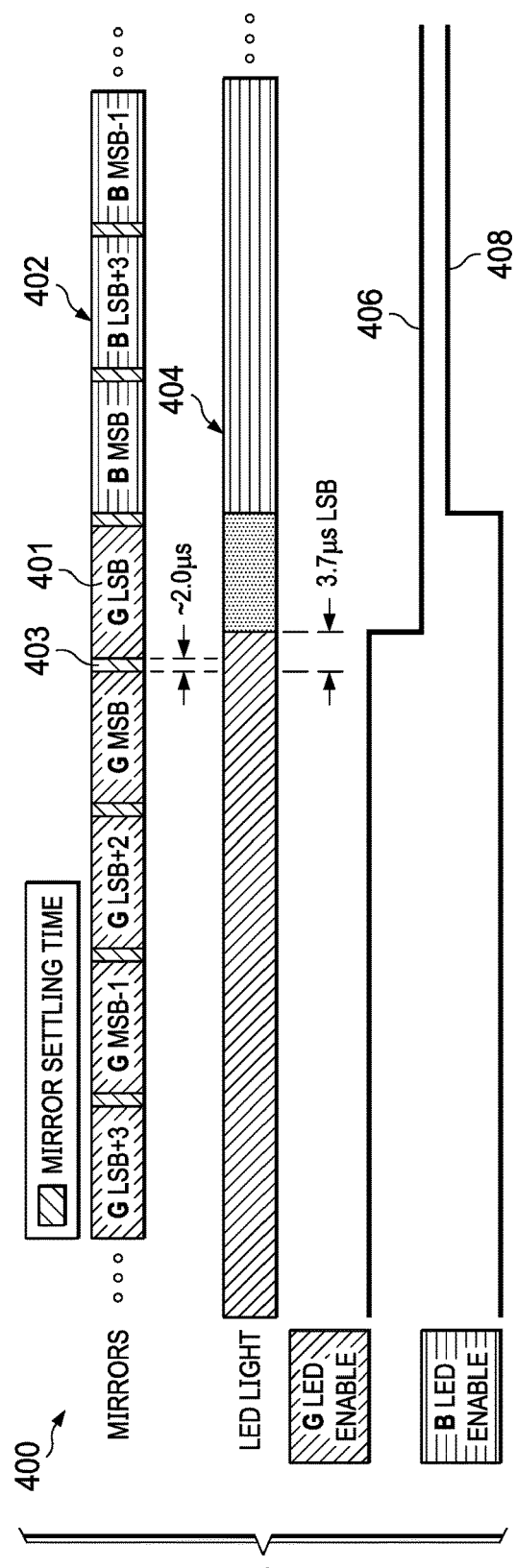
FIG. 4 is a timing diagram illustrating an example process for addressing the issue of where the spatial light modulator settling time is a large portion of a bit-plane.

FIG. 4 is a timing diagram 400 illustrating an example process for addressing the issue of where the spatial light modulator settling time is a large portion of a bit-plane. For example, with the least significant bit-plane, the micromirror settling time is a large portion of the bit-plane time. The process of FIG. 4 extends the time slot for the least significant bit-plane and ends the illumination after an additional time beyond the micromirror settling time. Time line 402 shows the position of the time slots for several bit-planes. Except for least significant bit-plane 401, the time slots are not to scale for clarity of explanation. In this example, the time slot for the least significant bit-plane 401 is extended to about 10 µs. As shown in illumination diagram 404 and timing diagram 406, the green illumination is shut off after about 3.7 µs. In this example, the assumption in the design of the system is that during the micromirror settling time 403, light for ON pixels will be directed to the projection optics about half the time. Therefore, the total light time is 2 µs/2 plus 1.7 µs or 2.7 µs. However, relying on assumptions about the behavior of the micromirrors during settling time introduces significant uncertainty. In this example, the subsequent blue illumination is shown in timing diagram 408.

Figure 5:
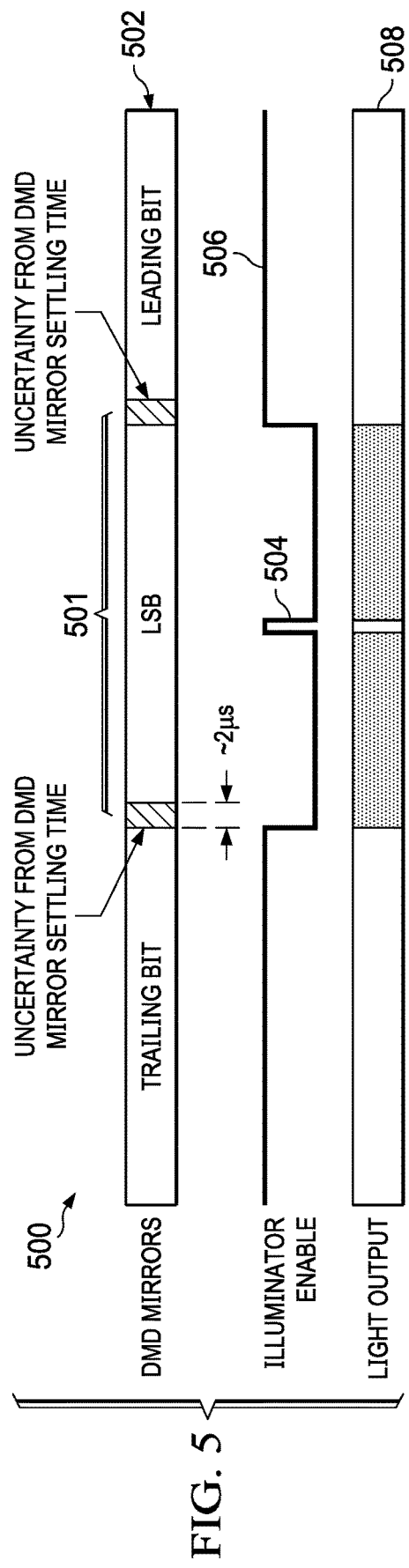
FIG. 5 is a timing diagram of an example illumination process for a least significant bit-plane using a full power pulse.

FIG. 5 is a timing diagram 500 of another example illumination process for a least significant bit-plane using a full power pulse Time line 502 shows the micromirror time of a trailing bit-plane, followed by the least significant bit-plane 501, followed by a leading bit-plane. These bit-planes are separated by micromirror settling times. Pulse 504 in illumination enable signal 506 is a full power pulse of 2.7 µs. Time line 508 shows the theoretical light output caused by pulse 504. However, a described hereinbelow regarding FIG. 8, the rise and fall times of the LED will require a longer pulse to get the necessary illumination amount. As also described hereinbelow regarding FIG. 8, a full power pulse for short bit-planes is not efficient.

Figure 6:
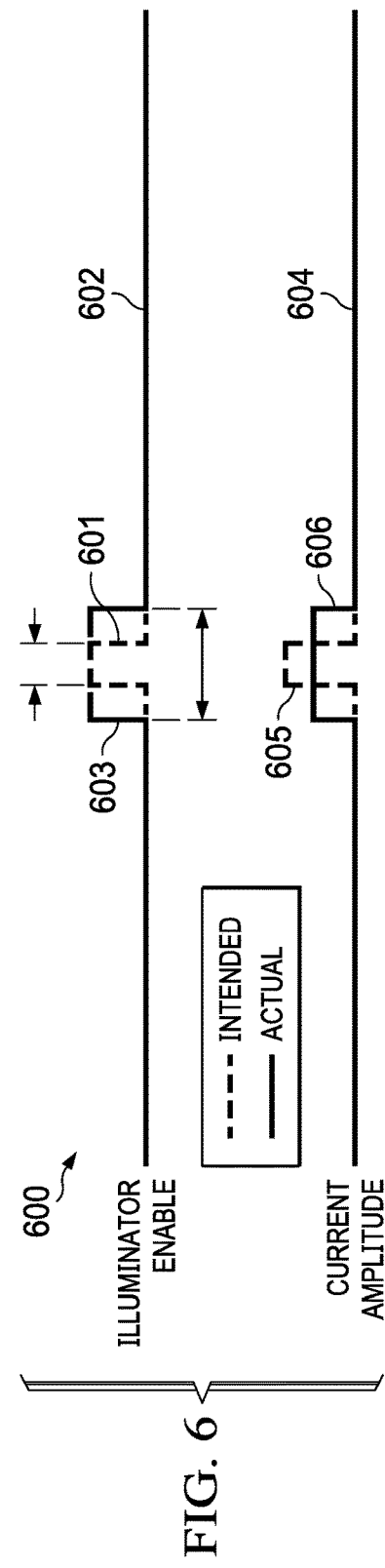
FIG. 6 is a timing diagram showing example processes for addressing inaccuracy of the light output with very short bit-planes.

FIG. 6 is a timing diagram 600 showing example processes for addressing inaccuracy of the light output with very short bit-planes. Time line 602 shows the theoretical or intended output 601 with the actual enable voltage pulse 603 needed to provide the desired illumination output. Time line 604 shows the intended output 605 as provided by a current pulse 606 that has a lower current level but a longer time period than intended output 605. Monitoring current, as opposed to relying on the applied voltage level of the pulse, more accurately tracks the light output of the LED because the light output is a function of the current through the LED.

Figure 7:
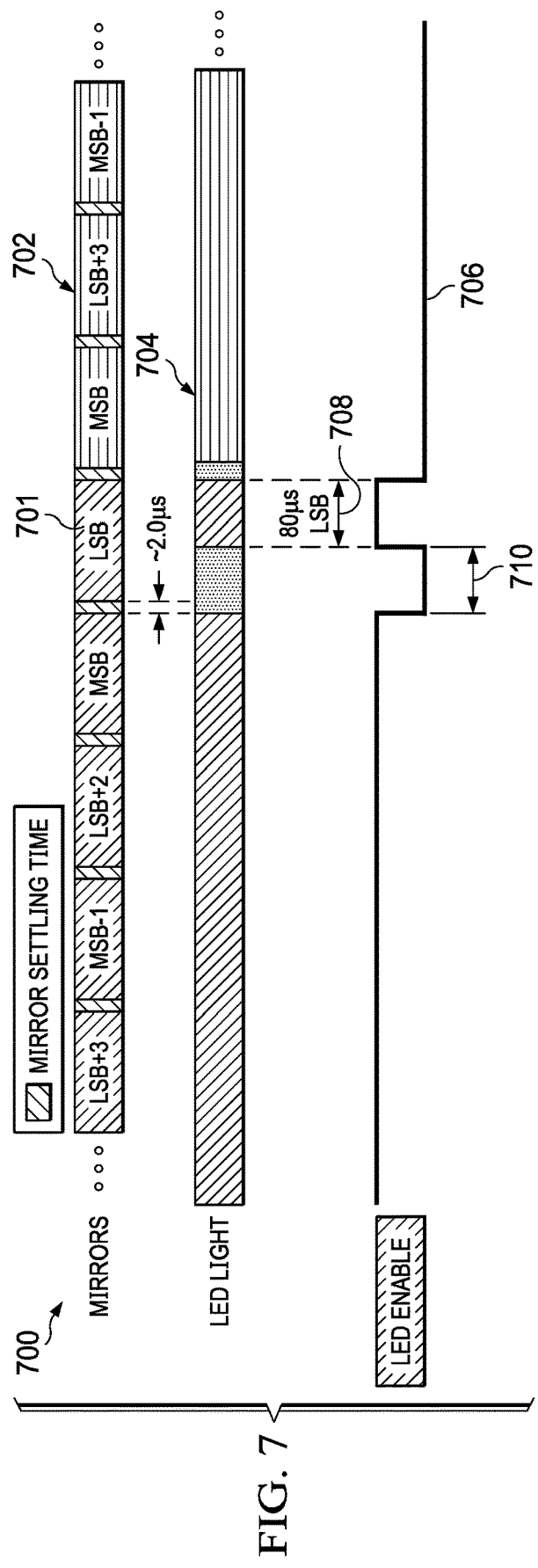
FIG. 7 shows a timing diagram illustrating an example illumination process.

FIG. 7 shows a timing diagram 700 illustrating an example illumination process. Least significant bit-plane 701 is extended to about 100 µs. This time is taken by reducing the other bit-planes by a percentage or extending the time between colors. The time lost for other bit-planes reduces brightness by an insignificant amount because of the greater overall length of time for the larger bit-planes. As shown in illumination line 704 and timing line 706, the green illumination is stopped at the beginning of the least significant bit-plane 701. Green illumination is then started at a lower brightness level and a corresponding lower current level for a time period 708 of approximately 80 µs. The time period between when the illumination is stopped and when the illumination is started is a settling time that may include a break-before-make time 710, which is further explained hereinbelow regarding FIGS. 11-13. The green illumination is then stopped before the end of least significant bit-plane 701.

With this example, the illumination time is between micromirror settling times. Thus, the illumination provided for the least significant bit-plane is much more accurate than illumination affected by mirror settling. As further explained herein below regarding FIGS. 8 and 9, using a lower illumination level extended over a longer period reduces the effect of rise and fall times of the light source output on the total illumination provided by the light source to provide more accurate illumination. The example of FIG. 7 shows one least significant bit-plane 701 where the illumination is started after a settling time and stopped before the beginning of a subsequent bit-plane. However, this process may be applied to more than one bit-plane. In another example, the three least significant bit-planes in green, the two least significant bit-planes in red and one significant bit-plane in blue employ this process. Because of the short time periods required by the least significant bit-planes, the time penalties for using the process of FIG. 7 is relatively small. The use of this process depends upon the total length necessary for each color. In the examples explained herein, each color has an equivalent time period. However, because of different perception of the colors by the eye and differing output of different color LEDs, the time period of each color may be longer or shorter than other colors, and certain colors may have more than one time period per frame. The use of the process of FIGS. 5 and 7 in multiple bit-planes allows for more accurate color depth in short bit-planes. For example, using the process of FIGS. 5 and 7, accurate color depths of nine to twelve bits are achievable with higher frame rates.

Figure 8:
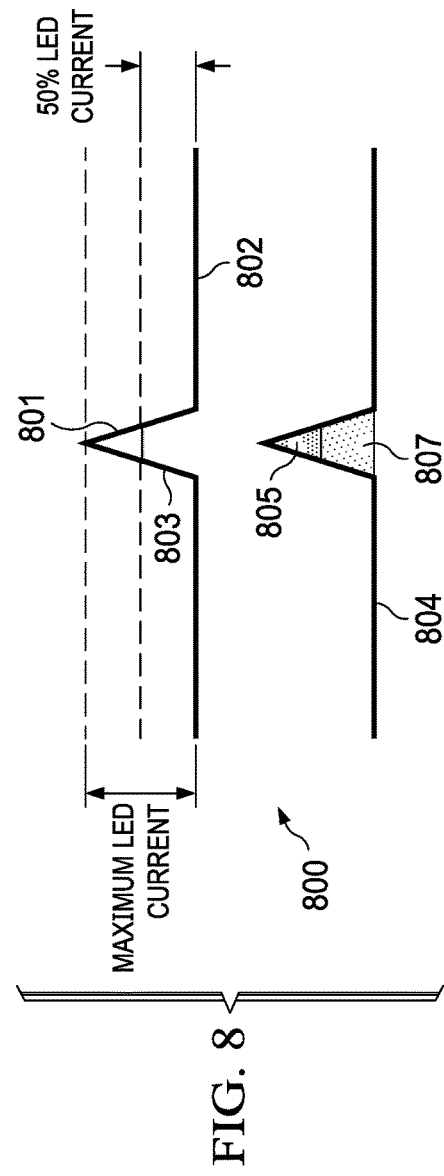
FIG. 8 is a timing diagram showing the light output of two input pulses.

FIG. 8 is a timing diagram 800 showing the light output of two input pulses on the order of 2.7 µs. Time line 802 shows the current applied to a light source such as an LED. Pulse 801 is a full power pulse and pulse 803 is half of full power. The slopes at the beginning and end of pulses 801 and 803 are caused by the rise and fall times necessary to reach the specified current levels. The output of these pulses is shown in light output line 804. Light output pulse 805 is the light output from pulse 801. Light output pulse 805 has a triangular shape because most of the time during the pulse is occupied by the rise and fall time of the light output of the LED. Light output pulse 807 is the light output pulse from pulse 803. Light output pulse 807 has a trapezoidal shape because much less of the pulse time is occupied by the rise and fall times of the output of the LED. In addition, the total light output of light output pulse 807 is ¾ of the output of light output pulse 805, but pulse 803 is only applying ½ of the power of pulse 801. Therefore, using a lower power pulse for very short bit-planes is more efficient, as well as more accurate.

Figure 9:
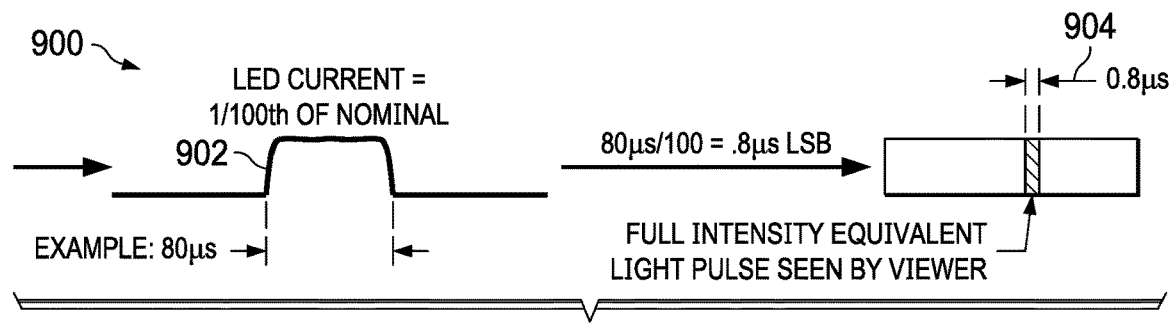
FIG. 9 is a timing diagram of an example light source driving pulse and the equivalent pulse as perceived by the viewer.

FIG. 9 is a timing diagram 900 of an example light source driving pulse. Pulse 902 is a current pulse through a light source such as an LED having an amplitude of $\frac{1}{100}^{th}$ of the current provided by a full power pulse. In this example, the desired pulse 904 is 0.8 µs at full power. Because the current of pulse 902 is $\frac{1}{100}^{th}$ of full power, pulse 902 is extended to 80 µs or 100 times the desired full-power pulse length. For very fast pulses such as pulse 902, the eye integrates the light output, and thus appears to the viewer as the same light energy of a 0.8 µs pulse at full power. Because the rise and fall times of the LED are a smaller portion of pulse 902, pulse 902 provides a more accurate light output than a full power pulse as shown in FIG. 8. In addition, because pulse 902 uses a small fraction of full power, pulse 902 is more efficient than a full-power pulse as shown above regarding FIG. 8.

Figure 10A:
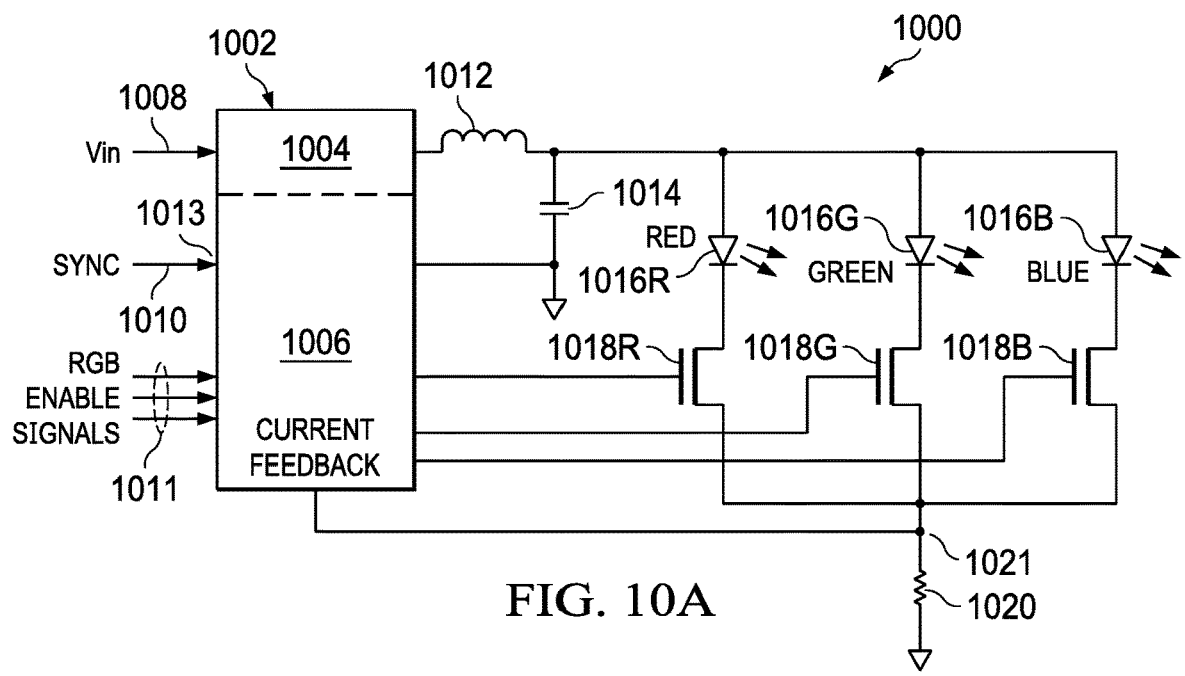
FIGS. 10A and 10B (collectively "FIG. 10") are circuit diagrams of an example illumination driver.
Figure 10B:
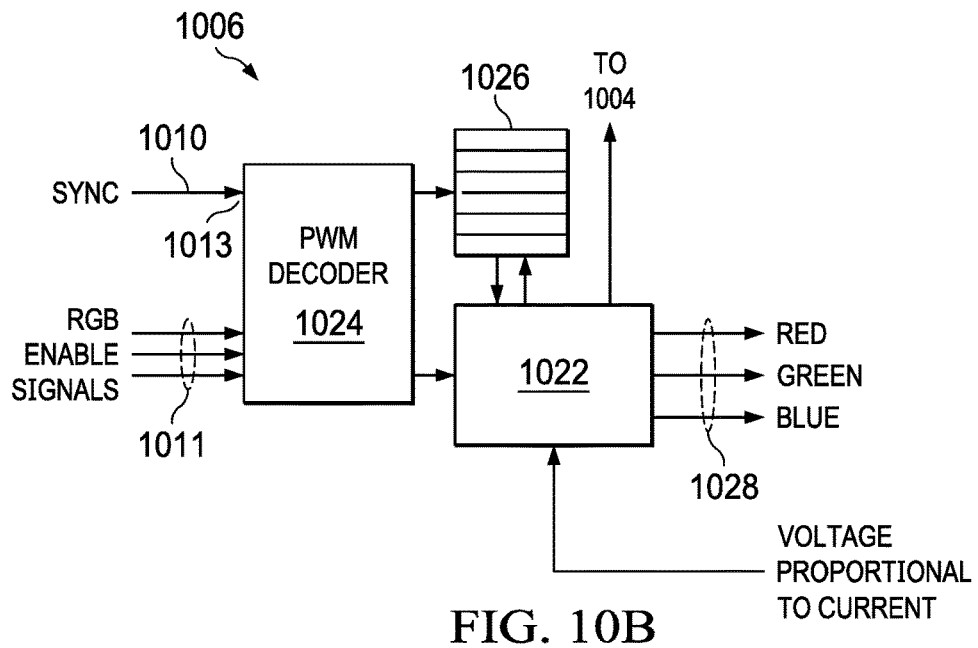

FIGS. 10A and 10B (collectively "FIG. 10") are circuit diagrams of an example illumination section. FIG. 10A is a circuit diagram of an example illumination section 1000. In this example, illumination controller 1002 is an integrated circuit. Illumination controller 1002 includes a variable voltage source such as buck converter 1004 and a controller such as control section 1006. Buck converter 1004 receives an input voltage Vin 1008 and provides a selectable voltage output. Along with inductor 1012 and capacitor 1014, buck converter 1004 provides the selectable voltage output to illumination devices such as to the anodes of red LED 1016R, green LED 1016G, and blue LED 1016B under the control of control section 1006. Control section 1006 determines the output voltage of buck converter 1004. In other examples, inductor 1012 and/or capacitor 1014 are integrated into illumination controller 1002 in buck converter 1004.

Synchronization (SYNC) signal 1010 and RGB enable signals 1011 are, in this example, pulse width modulated signals indicating which bit-plane of which color is to be produced by red LED 1016R, green LED 1016G, or blue LED 1016B. Transistor 1018R, transistor 1018G and transistor 1018B enable red LED 1016R, green LED 1016G, and blue LED 1016B, respectively, under the control of control section 1006. In this example, transistor 1018R, transistor 1018G and transistor 1018B are field-effect transistors (FETs). The use of transistor 1018R, transistor 1018G and transistor 1018B allows for quick turn off of red LED 1016R, green LED 1016G, and blue LED 1016B, respectively. When the FET is turned off, the current through the LED stops very quickly. Thus, fall time errors for the total LSB light energy are very small.

The sources of transistor 1018R, transistor 1018G and transistor 1018B are coupled to the cathodes of red LED 1016R, green LED 1016G, and blue LED 1016B, respectively. The drains of transistor 1018R, transistor 1018G and transistor 1018B are coupled to a reference potential through resistor 1020. Resistor 1020 allows monitoring of the current through one of red LED 1016R, green LED 1016G, or blue LED 1016B depending on which LED is illuminated. When one of transistor 1018R, transistor 1018G and transistor 1018B is on, resistor 1020 is in series with the respective one of red LED 1016R, green LED 1016G, or blue LED 1016B. The voltage across resistor 1020 is proportional to the current through resistor 1020 according to Ohm's Law. Thus, the voltage across resistor 1020 is a measure of the current through the respective one of red LED 1016R, green LED 1016G, or blue LED 1016B. In an example, resistor 1020 is a resistor of 25 mΩ. Node 1021 is coupled to control section 1006 to monitor the current through one of red LED 1016R, green LED 1016G, or blue LED 1016B.

FIG. 10B is a detail circuit diagram of control section 1006. SYNC signal 1010 and RGB enable signals 1011 are provided at input port 1013 to pulse-width-modulation (PWM) decoder 1024. PWM decoder 1024 decodes SYNC signal 1010 and provides control signals to a system of at least two registers, such as look-up table 1026, for storing current level information for the LSB(s) for illumination processes including intended current levels to be used during different bit-plane display times, timing information, and voltage level information. PWM decoder 1024 also provides control signals to controller 1022. For full power bit-planes table 1026 provides a full power signal to buck converter 1004 and then enables the appropriate LED using one of lines 1028, which are coupled to the respective gates of transistors 1018R, 1018G and 1018B. For bit-planes displayed using the process described regarding FIG. 7, look-up table 1026 provides a lower power signal to controller 1022, which provides a lower power signal to buck converter 1004 and enables the appropriate LED according to the timing described regarding FIGS. 7 and 9. Thus, table 1026 includes at least two bit-plane illumination processes. Using a switching regulator like buck converter 1004 maximizes driver power efficiency because a switching regulator gives the best efficiency at each voltage level. In an example, a once-per-frame SYNC signal 1010 will tell control section 1006 to restart the order in which least significant bits that use the process of FIG. 7 will be used over the frame time. Thus, the control section 1006 knows which register to use next. Using look-up table 1026 eliminates the need for a separate LED driver circuit for full-power bit-planes and bit-planes that use the process of FIG. 7.

Controller 1022 receives the signal from node 1021, which is a voltage proportional to the current through one of red LED 1016R, green LED 1016G, or blue LED 1016B, and thus provides a current level indication. Look-up table 1026 includes the node 1021 voltage corresponding to the intended current through red LED 1016R, green LED 1016G, or blue LED 1016B. If the measured node 1021 voltage is different from the intended voltage at node 1021, controller 1022 determines a new voltage to be applied to the LED (VLED) to result in the intended measured voltage at node 1021. This adjustment allows for the current through the respective one of red LED 1016R, green LED 1016G, or blue LED 1016B to be accurately controlled.

Figure 11:
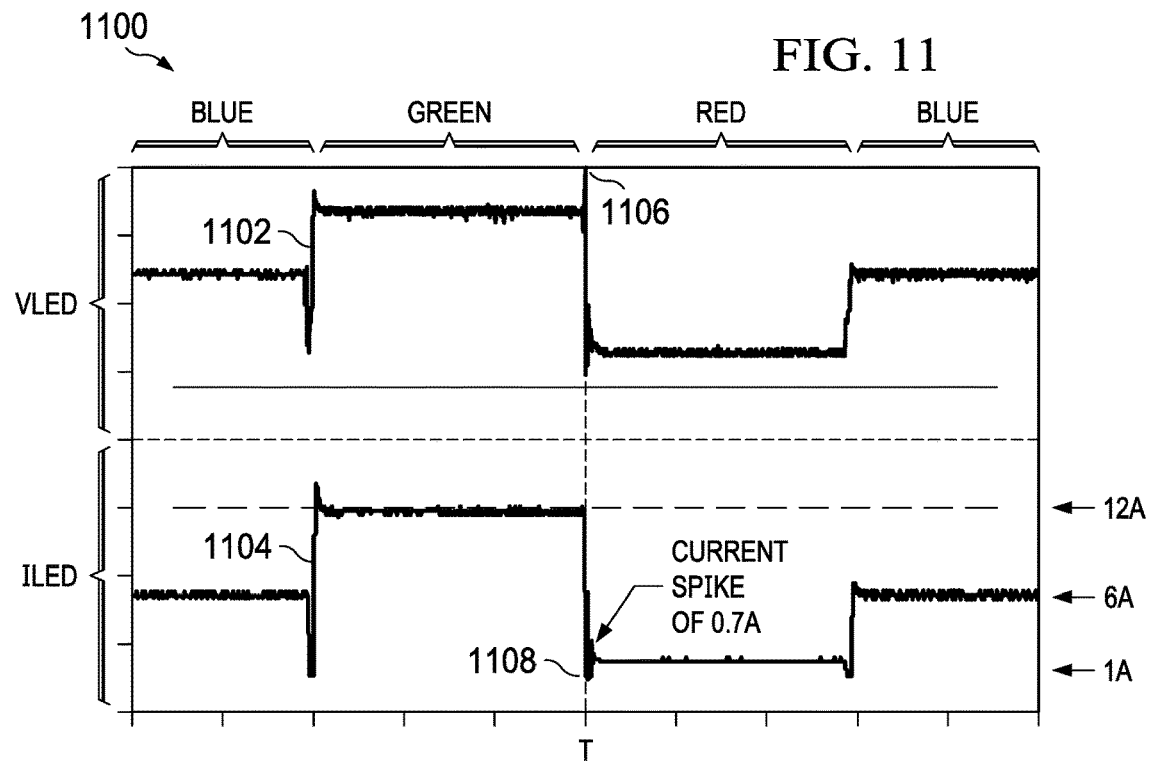
FIG. 11 is a graph of experimental data.

FIG. 11 is a graph 1100 of experimental data comparing the voltage driving an illumination source such as one of red LED 1016R, green LED 1016G, or blue LED 1016B (FIG. 10) and the resulting current through the LED. Trace 1102 is the voltage applied to the LED (VLED). Trace 1104 is the current through the LED (ILED). VLED changes at time 1106. Because of the feedback-based control loop that sets the LED current based on the feedback voltage from resistor 1020, VLED overshoots and causes a current spike 1108. Analog control loops take time to settle. Such current spikes are undesirable because the light output caused by the current spike is unpredictable.

Figure 12:
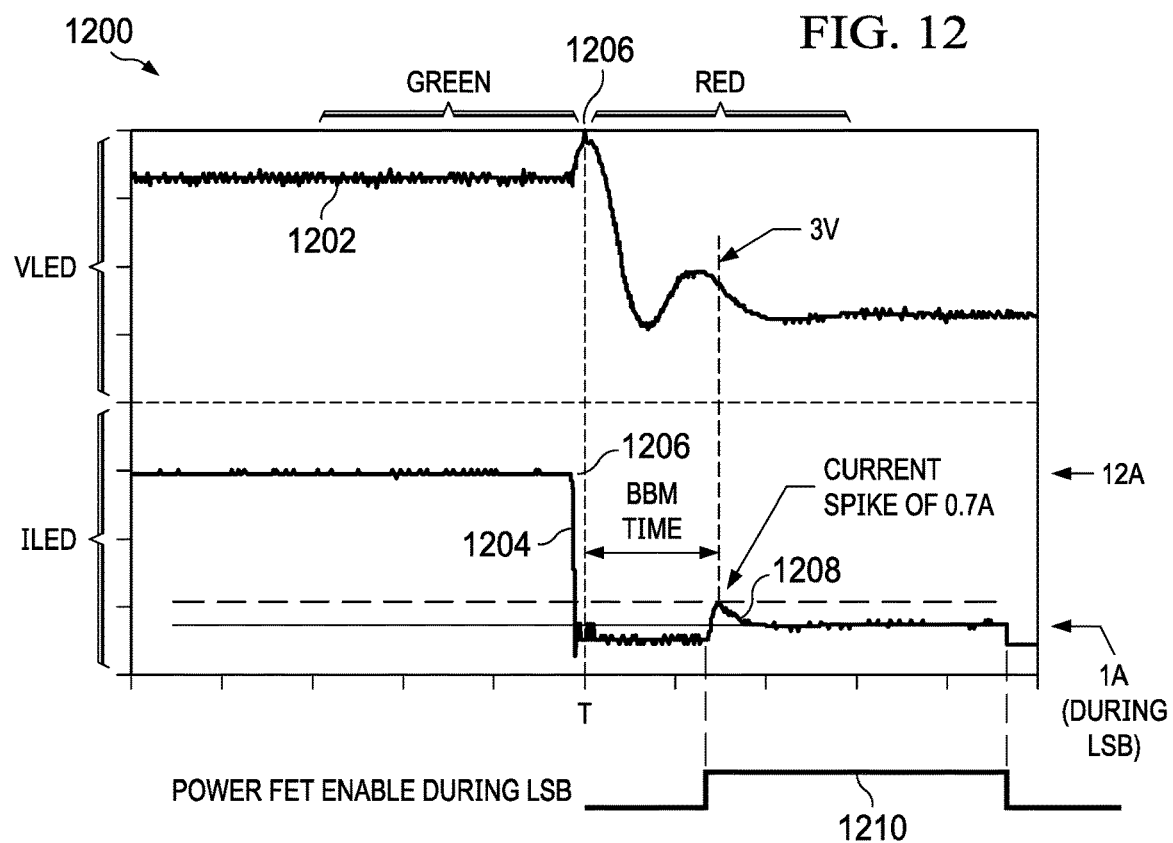
FIG. 12 is a graph of experimental data comparing a light emitting diode (LED) voltage (VLED) and an LED current (ILED) with an inadequate break-before-make (BBM) time.

FIG. 12 is a graph 1200 of experimental data comparing VLED and ILED with an inadequate break-before-make (BBM) time. In this simulation, an enable transistor, such as one of transistors 1018R, 1018G and 1018B, is enabled after the voltage transition. Trace 1202 shows VLED. Trace 1204 shows ILED. When VLED transitions to a lower voltage at time 1206, the enable transistor is off, so ILED is essentially zero. At time 1210, the enable transistor turns on. The time between the change of VLED and the time the enable transistor turns settles to provide a constant current is defined as the break-before-make (BBM) time. In FIG. 12, time 1210 is before VLED has settled to a steady state. This causes current spike 1208, which is undesirable. Therefore, FIG. 12 illustrates an inadequate BBM time.

Figure 13:
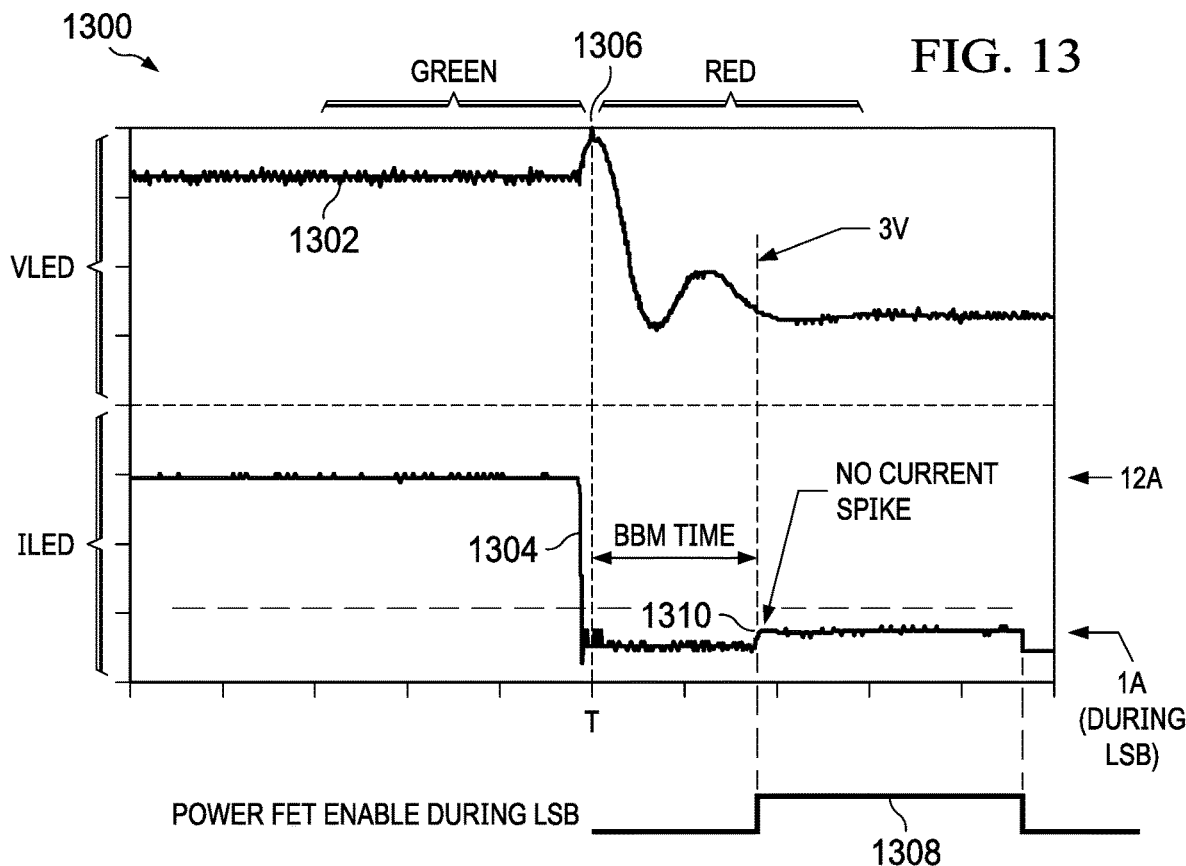
FIG. 13 is a graph of experimental data comparing VLED and ILED with an adequate BBM time.

FIG. 13 is a graph 1300 of experimental data comparing VLED and ILED with an adequate BBM time. Trace 1302 is VLED. Trace 1304 is ILED. VLED transitions at time 1306 and the enable transistor turns on at time 1308, thus defining the BBM time. As shown in FIG. 13, there is no current spike at point 1310. Thus, providing an adequate BBM time where VLED has settled avoids a current spike.

Therefore, the BBM time, such as time 710 (FIG. 7) includes time for the micromirrors to settle and for the LED current to settle.

Figure 14:
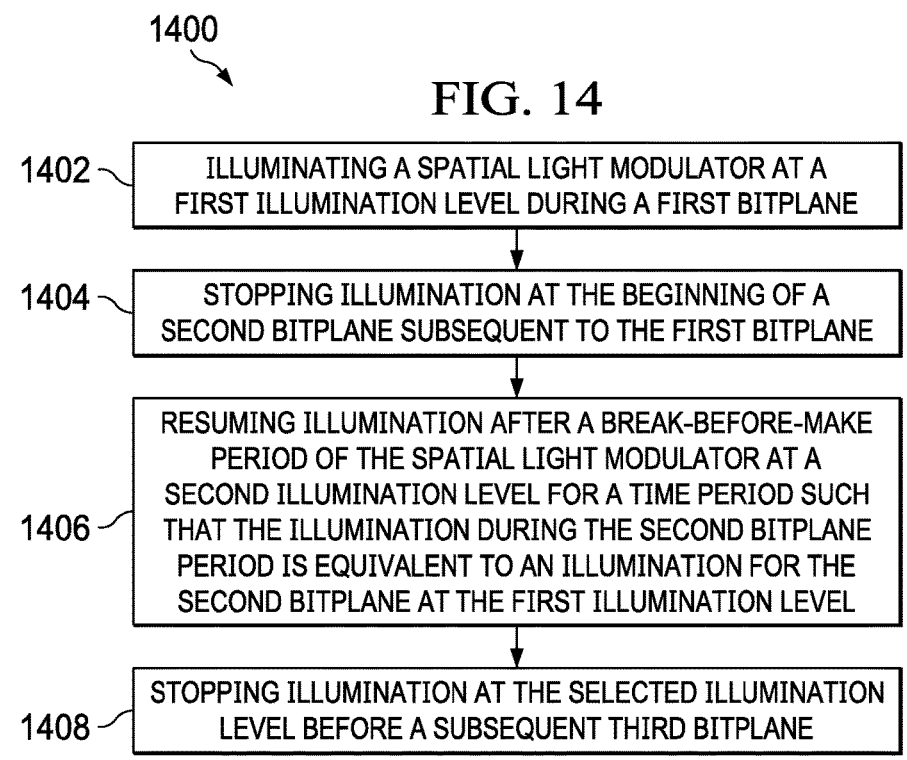
FIG. 14 is a flow diagram of an example process.

FIG. 14 is a flow diagram 1400 of an example process. Step 1402 is illuminating a spatial light modulator at a first illumination level during a first bit-plane. For example, this step is performed for the trailing bit-plane of time line 502 (FIG. 5) or G MSB of time line 702 (FIG. 7). Step 1404 is stopping illumination at the beginning of a second bit-plane subsequent to the first bit-plane. This is the end of the trailing bit-plane of time line 502 (FIG. 5) or G MSB of time line 702 (FIG. 7). Step 1406 is resuming illumination after a settling period of the spatial light modulator at a second illumination level for a time period such that the illumination energy during the second bit-plane period is equivalent to an illumination energy for the second bit-plane if the second bit-plane were driven at the first illumination level for the time duration corresponding to the LSB time without the extended time period. The settling period is the time period after the end of the trailing bit-plane and the beginning of pulse 504 as shown in FIG. 5 or the beginning of time period 708 (FIG. 7). As explained hereinabove, a settling period may include a break-before-make period that allows for micromirror settling as well as time for settling of the voltage applied to the LED to improve accuracy of the current applied to the LED. The second bit-plane is the least significant bit-plane 501 as shown in FIG. 5 or LSB 701 of FIG. 7. The illumination for the least significant bit-plane at the first illumination level is the intended energy output 601 (FIG. 6). The time period such that the illumination energy during the least significant bit-plane is equivalent to the intended illumination energy is the time of pulse 902 at the lower drive current (FIG. 9). Step 1408 is stopping illumination at the selected illumination level before a subsequent third bit-plane. The illumination is stopped at the end of pulse 902 (FIG. 9). The third bit-plane is the leading bit-plane of time line 502 (FIG. 5) or B MSB of time line 702 (FIG. 7).

Modifications are possible in the described examples, and other examples are possible, within the scope of the claims.

What is claimed is:

1. A method comprising:
   applying first data to a spatial light modulator for a first bit-plane;
   illuminating the spatial light modulator at a first illumination level during a settling time for the spatial light modulator for the first bit-plane for a first time period;
   applying second data to the spatial light modulator for a second bit-plane after illuminating the spatial light modulator for the first bit-plane; and
   illuminating the spatial light modulator at a second illumination level during the second bit-plane for a second time period a delay after applying the second data to the spatial light modulator for the second bit-plane, wherein the second bit-plane is a least significant bit bit-plane, the second illumination level is lower than the first illumination level, and the delay is longer than a settling time for a current driving an illumination source.

2. The method of claim 1, wherein the delay is a mirror settling time.

3. The method of claim 1, wherein the spatial light modulator is a digital micromirror device.

4. The method of claim 1, wherein the delay is longer than the settling time for the spatial light modulator.

5. The method of claim 1, wherein the first illumination level and the second illumination level are provided by a light emitting diode or a laser diode.

6. The method of claim 1, wherein the second time period is about 80 μs.

7. The method of claim 1, wherein illuminating the spatial light modulator at the second illumination level comprises illuminating the spatial light modulator with green light.

8. The method of claim 1, wherein applying the second data to the spatial light modulator for the second bit-plane comprises transmitting a pulse width modulation signal.

9. A system comprising:
   a spatial light modulator;
   an illumination source optically coupled to the spatial light modulator; and
   a controller coupled to the spatial light modulator and to the illumination source, the controller configured to:
   apply first data to the spatial light modulator for a first bit-plane;
   instruct the illumination source to illuminate the spatial light modulator for the first bit-plane at a first illumination level during a settling time for the spatial light modulator for the first bit-plane;
   apply second data to the spatial light modulator for a second bit-plane; and
   instruct the illumination source to illuminate the spatial light modulator at a second illumination level during the second bit-plane for a second time period a delay after applying the second data to the spatial light modulator for the second bit-plane, wherein the second bit-plane is a least significant bit bit-plane, the second illumination level is lower than the first illumination level, and the delay is longer than a settling time for a current driving the illumination source.

10. The system of claim 9, wherein the spatial light modulator is a digital micromirror device.

11. The system of claim 9, wherein the delay is longer than the settling time for the spatial light modulator.

12. The system of claim 9, wherein the illumination source comprises a light emitting diode or a laser diode.

13. The system of claim 9, wherein the second time period is about 80 μs.

14. The system of claim 9, wherein illuminating the spatial light modulator at the second illumination level comprises illuminating the spatial light modulator with green light.

15. The system of claim 9, wherein applying the second data to the spatial light modulator for the second bit-plane comprises transmitting a pulse width modulation signal.

16. The system of claim 9, wherein the system is a near eye display.

17. A controller configured to:
   apply first data to a spatial light modulator for a first bit-plane;
   instruct an illumination source to illuminate the spatial light modulator at a first illumination level during a settling time for the spatial light modulator for the first bit-plane;
   apply second data to the spatial light modulator for a second bit-plane after applying the first data to the spatial light modulator for the first bit-plane; and
   instruct the illumination source to illuminate the spatial light modulator at a second illumination level during the second bit-plane for a second time period a delay after applying the second data to the spatial light modulator for the second bit-plane, wherein the second bit-plane is a least significant bit bit-plane, the second illumination level is lower than the first illumination level, and the delay is longer than a settling time for a current driving the illumination source.

18. The controller of claim 17, wherein setting the spatial light modulator for the second bit-plane comprises transmitting a pulse width modulation signal.

19. The controller of claim 17, wherein the second time period is about 80 µs.

20. The controller of claim 17, wherein the delay is longer than the settling time for the spatial light modulator.

* * * * *